Jan. 30, 1940.　　　　　M. BONOTTO　　　　2,188,673
FILTER FOR FILTERING LIQUIDS

Filed Aug. 31, 1935　　　2 Sheets-Sheet 1

INVENTOR.
Michele Bonotto
BY
Joseph F. O'Brien
ATTORNEY.

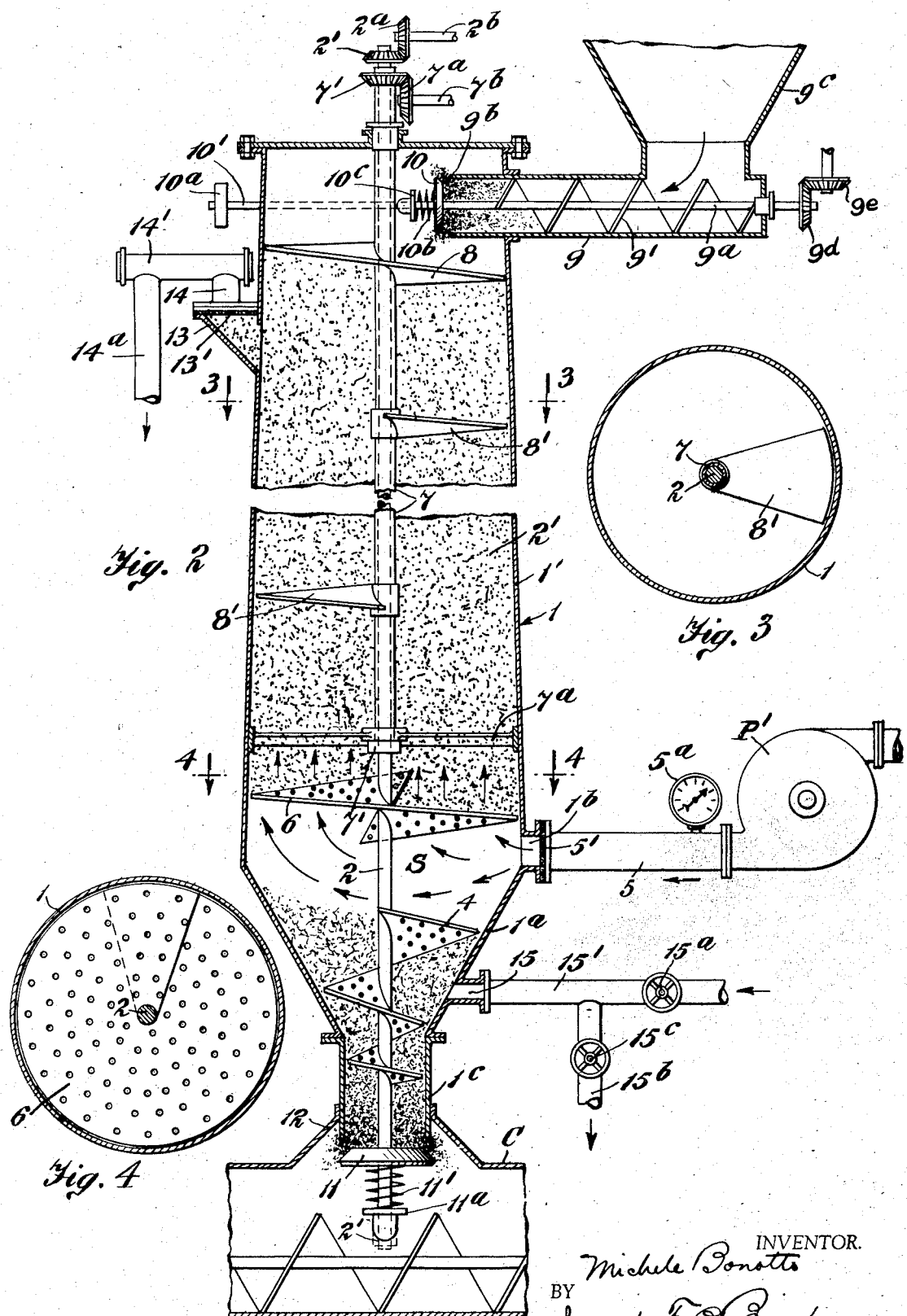

Patented Jan. 30, 1940

2,188,673

UNITED STATES PATENT OFFICE 2,188,673

FILTER FOR FILTERING LIQUIDS

Michele Bonotto, Evansville, Ind., assignor to Extractol Process, Ltd., Wilmington, Del., a corporation of Delaware Application August 31, 1935, Serial No. 38,805

4 Claims. (Cl. 210—141)

This invention relates to improvements in filters for filtering liquids containing solid particles in suspension, and particularly for filtering miscella and the like.

In the extraction of oil from oil-bearing materials by the solvent process, for example, the resultant mixture of oil and solvent, which is called miscella, contains fine particles of solid matter from the oil-bearing material and these fine particles must be filtered out before the miscella is sent to the solvent-recovery apparatus or distiller where the solvent is recovered from the oil and then led back into the extraction system. If the miscella is not thoroughly filtered before being led into the solvent-recovery apparatus the said fine particles carried by the miscella will, during treatment of the said miscella, go into the evaporating system of the recovery apparatus or distiller, and create trouble in the heat transfer section by the fouling of the heat transfer surfaces, thus making it necessary to frequently clean the heat-exchangers with the result that great economical losses occur in waste of steam, solvent and labor.

Various forms of filtering apparatus are, in the common practice of the oil extraction industry, employed to remedy this condition.

In batch systems of extraction, the miscella is filtered as it passes through the material during circulation through the extractor and an additional filtration is applied only as the miscella leaves the extractor. In the batch-system extraction, therefore, the importance of filtering apparatus is not very great because it is only necessary to filter out the few particles which occasionally pass through the filtering chamber of the extractor.

In continuous counter-current extraction processes, however, the filtration of the miscella is of far more importance, because a filtering action is not accomplished in the extractor. This is due to the fact that the material moves in counter-current to the solvent and is also due to the fact that the conveying mechanism which moves the material in counter current to the solvent has a stirring action. It is common practice to insert in such systems a filter or a series of filters between the outlet for the solvent from the extraction apparatus and the solvent recovery apparatus or distiller.

Several types of filters are now in use but all need frequent periodical cleaning. Such cleaning necessitates the opening of the filter, and the taking apart its various elements, involving loss of time and labor. In that operation a loss of solvent also occurs, but, more important than all other factors, the evaporation of such solvent while the filter is open and being cleaned provides conditions which increase the possibility of accidents from explosions and fire. In some systems where the filter presses are used, if the solvent is of an explosive or inflammable nature, it has been necessary, in order to avoid danger, to insert a vacuum system to dry the filter before opening. In such cases, a really complicated arrangement results.

My invention is intended to overcome all the difficulties hereinabove specified by the use of a continuous filter in which a circulative filtering material such as the material extracted or to be extracted is employed as a filtering medium. By the use of the term circulative filtering material, I mean a granular, flaked or like material, which is capable of being fed into the filtering apparatus, then employed as a bed of filtering material which is dischargeable from one end of the bed and renewable from the opposite end without opening the apparatus, and in the preferred form of my invention, mechanical means is provided for discharging and replacing said medium without opening the filter.

In accordance with the preferred form of my invention, when the filter becomes clogged by the accumulation of fine particles coming from the miscella being filtered, the whole or part of the bed of material which was used for a filtering medium is, without opening the container, discharged into the main stream of an extraction system and replaced by fresh filtering material coming from the main stock of material to be extracted.

My continuous filter is especially suitable to operate in connection with the continuous extraction apparatus of my application Serial No. 753,266 filed November 16, 1934, and especially in connection with the continuous dryer shown in said application, but it may be also used with other extraction systems by simply connecting the delivering end of the filter to the drying section thereof.

With these and other objects in view the invention comprises the combination of members and arrangement of parts so combined as to co-act and cooperate with each other in the performance of the functions and accomplishment of the results herein contemplated and comprises in one of its adaptations the species or preferred form illustrated in the accompanying drawings, in which:

Fig. 2 is a central vertical section through a filter tank and mechanism embodying my invention;

Fig. 3 is a section on the line 3—3 of Fig. 2, looking in the direction of the arrows; and Fig. 4 is a section on the line 4—4 of Fig. 2 looking in the direction of the arrows.

Figure 1:
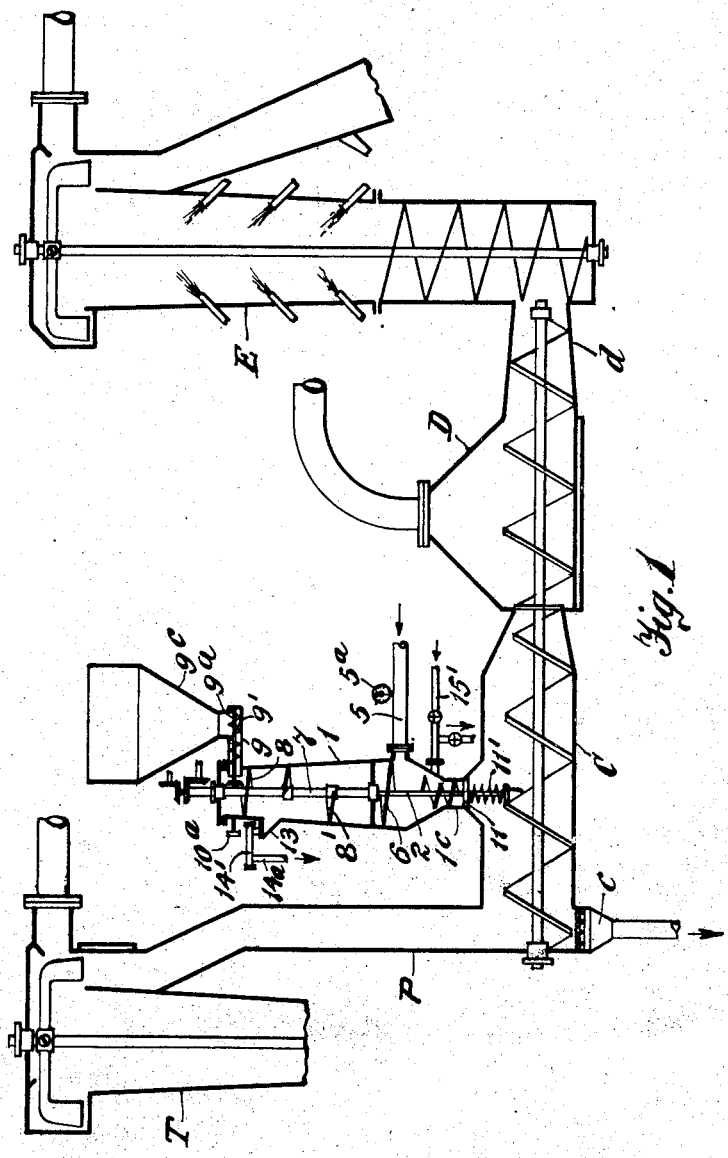
Fig. 1 is a diagrammatic view of a part of a continuous oil extracting system showing my filter in connection therewith.

Referring now to these drawings, which illustrate a preferred embodiment of my invention, D is a drier one end of which is connected by conduit C having drain c with a material pipe P leading from a final-material treating tank T and the other end is connected by conduit d to a solvent eliminating tank, all embodied in a continuous oil extraction system such as more fully disclosed in my said co-pending application Serial No. 753,266.

In said embodiment of my invention, 1 indicates a filter tank or container having a substantially cylindrical top section 1' and a conical bottom section 1ᵃ. Extending axially through the tank 1 is a main shaft 2 which at its lower end is supported in a suitable bearing 2' preferably located within the conduit C of my said continuous oil extraction system.

The tank 1 is provided at its lower end and preferably at the junction between the cylindrical top section 1' and the conical bottom section 1ᵃ with a miscella inlet 1ᵇ to which is connected a miscella feed-pipe 5, through which is pumped, by any suitable pump P', from a suitable reservoir (not shown), miscella which may be derived from the operation of the continuous system in connection with which my improved filter is adapted to be employed.

The said main shaft 2 has mounted thereon at its lower end below the inlet 1ᵇ, a discharging screw 4, and also is provided, at a position spaced from said discharging screw and above said inlet, with a perforated holding plate 6 for the filtering material.

The said main shaft 2 passes through a secondary shaft 7 which is supported or mounted at its lower end in a bearing 7' supported within the tank 1 in a bracket 7ᵃ connected to the inner wall of the tank in any suitable manner. Said shaft 7 is provided with a series of packing paddles 8, 8', adapted to produce a downward driving action on filtering-material within the tank. Said shaft 7 is also provided at its upper end with a packing disc 6 which similarly has a downward driving action upon filtering material in the tank. Each of such shafts 7 and 2 is provided with independent means for rotation thereof so that they may be revolved independently of each other and also simultaneously. As shown, the shaft 2 extends through the top plate of the tank 1 and is provided above the top plate thereof with a bevelled pinion 2' which meshes with a bevelled pinion 2ᵃ on a horizontal shaft 2ᵇ, rotated from any suitable source of power not shown. Also as illustrated, the shaft 7 likewise extends through the top plate of the tank and is provided above said top plate with a bevelled pinion 7' which meshes with a pinion 7ᵃ on a horizontal shaft 7ᵇ rotated from any suitable source of power not shown. Obviously any suitable mechanism may be employed to rotate the shafts 2ᵇ and 7ᵇ independently of each other or simultaneously as desired.

The tank 1 is provided near its upper end with a feed conduit 9 for feeding to a filtering material feed zone within the tank the filtering material employed by me. This conduit 9 is provided with a screw conveyor 9' adapted to feed such material from a hopper 9ᶜ into which is fed a supply of material which is being extracted in the continuous system with which my filter is connected. This hopper may be filled from any suitable source not shown. In the preferred form of my invention illustrated, the feed or outlet end 9ᵇ of said conduit 9 is, at the beginning of operation, closed by a spring-pressed valve 10 and the conveyor screw 9' forces the material against the valve 10 so as to compress the same at said outlet end 9ᵇ and to form at said outlet end a compressed plug of material.

The lower discharge end of the filter tank 1 is provided with an outlet section or discharge zone 1ᶜ for discharging filtering material from the tank 1 and the discharge end of said outlet section or discharge zone 1ᶜ is also provided with a spring pressed valve 11 against which the discharge screw 4 is adapted to build up at 12 a plug of compressed material.

The upper end of the filter bed section is provided with a miscella outlet 13 having a screen 13' to which is connected a pipe 14, a sight-glass 14' and pipe 14ᵃ to conduct away from the filter miscella which has been filtered through the filtering material.

The valve 11 at the bottom of the cylinder is arranged to provide a continuous plug of material, the density of which is regulated by a spring 11' which is disposed between an abutment plate 11ᵃ and the valve 11, and holds said valve against the pressure of material being forced downwardly through the end of the section 1ᶜ by the screw.

The valve 10 and screw 9' which is rotated by shaft 9ᶜ and bevelled pinions 9ᵈ and 9ᵉ provides a similar arrangement at the outlet end 9ᵇ of the feeding conduit 9 within the top part of the tank 1, and I preferably provide means such as the rod 10' and wheel 10ᵃ for regulating the tension of a spring 10ᵇ arranged between an abutment place 10ᶜ and said valve 10.

With this construction it is possible that the filtering material be fed into the filter tank and withdrawn therefrom without any opening up of said filter tank and without permitting the escape of the liquid to be filtered through the openings.

The miscella to be filtered is introduced into the filter tank from pipe 5, filters through the bed of material 2ᵡ and flows out in filtered condition from pipe 14 through a sight glass 14'.

A strong metallic screen 5' is provided in pipe 5.

In the lower part of the bottom cone 1ᵃ an inlet 15 is provided which is connected to pipe 15' to introduce pure solvent in the filter for washing the filtering material when it is discharged into the conduit C of the extraction system and when a cleaning of the filter is desired. A valve 15ᵃ and a drain pipe 15ᵇ having a valve 15ᶜ is connected in the same line 15'.

Assuming that the tank 1 is empty and the hopper 9ᶜ filled with material, the shaft 2 is rotated and a given amount of filtering-material is introduced into the tank 1 through conduit 9 by rotating screw 9'. In that way, the bottom screw 4 starts building up the continuous plug 12. When the continuous plug is built up to sufficient density the main shaft 2 is stopped. Below the holding disc 6 and above the continuous plug 12 there is an empty space S which after formation of the filter bed as hereinafter specified allows the expansion of miscella which is pumped in through pipe 5. To form the filter bed shaft 7 is then rotated and additional filtering material is introduced through the conduit 9. In that way, the upper section 1' of the tank 1 is filled with a bed 2' of filtering material and this bed of material is compressed against the holding disc 6 to the desired extent by the packing paddles 8', 8' and the packing disc 8. When the desired filter bed or strata is built up, shaft 7 is stopped and the miscella is pumped through the filter bed 2' from the pipe 5. The desired degree of packing is shown by a pressure gauge 5ª installed on the pipe line 5 between a pump 16 and the filter. The pressure gauge 5ª measures the resistance that is encountered by the miscella in passing through the filter.

If the liquid coming out from pipe 14ª is not clear enough, a few revolutions of shaft 7 and/or the feeding of more material will give more compression to the filtering material and increase the filtering action of the bed or strata 2'.

The degree of fineness of the filtering material also affects the filtering action of the apparatus, and in the case of some materials it may be desirable in the bed 2' to alternate strata or layers of coarser ground material with strata or layers of finely ground material.

If, after operation for a given period or after a certain amount of miscella has passed through the filter, the pressure in pipe 5, shown by the pressure gauge, increases and approaches a given maximum, this will indicate that the filter has started clogging up because the fine particles to be filtered out as hereinabove specified, have collected in the interstices of the filtering medium, thus causing such increased pressure. Such clogging action, of course, starts from the lower part of the filter so that only the lower section of the filter will be clogged. When the given maximum pressure is reached, the clogged portion of the filtering medium may be forced out and replaced by new material coming from the top. This may be accomplished by temporarily stopping the feed of miscella and by rotating both shafts 2 and 7 simultaneously. After the clogged portion is discharged from the apparatus, shafts 2 and 7 are stopped, and the filter is again ready for its filtering operation.

If desired, it is possible to wash the portion of material discharged by introducing pure solvent through inlet 15 and pipe 15' so that said portion leaving the apparatus is freed from any residue of miscella which may have permeated the filtering material.

The holding disc 6 is preferably perforated and of shallow spiral formation to allow a better distribution of the stream of miscella in its upward flow.

All the apparatus is vapor tight and the pressure of the spring regulating the stiffness of the continuous plugs are so calculated that the continuous plug 12 at the bottom will have a compression high enough to prevent the liquid miscella from passing through.

It will be seen that by my invention, I feed filtering material into the tank through a continuously closed inlet and discharge filtering material through a similarly continuously closed outlet, and that neither the building up of the filtering bed, nor the discharging of part thereof, nor the renewal of a part of the whole of the bed requires the opening up of the tank.

I claim:

1. A filter for filtering liquids embodying, in combination, a container, a filtering-material feed-conduit connected with said container, means cooperating with said feed-conduit for providing and moving through said feed-conduit a compressed impermeable plug of filtering material, a rotatable supporting member within said container for releasably supporting a bed of filtering material therein, an independently rotatable packing mechanism disposed above said supporting member, a conduit at one end of said bed for feeding a liquid to be filtered through said supported bed of material, an outlet conduit for said liquid at the opposite end of said bed, and means for periodically releasing filtering material from said bed, said tank having a discharge outlet for discharging said released filtering material from said tank.

2. A filter for filtering liquids embodying, in combination, a container, a filtering-material feed-conduit connected with said container, means cooperating with said feed-conduit for providing and moving through said feed-conduit a compressed impermeable plug of filtering material, a rotatable supporting member within said container for releasably supporting a bed of filtering material therein, an independently rotatable packing mechanism disposed above said supporting member, a conduit at one end of said bed for feeding a liquid to be filtered through said supported bed of material, an outlet conduit for said liquid at the opposite end of said bed, and screw and valve mechanism cooperating with said outlet conduit to form a liquid-impervious plug therein and to move said plug through said conduit to discharge material from the tank.

3. A filter for filtering liquids embodying, in combination, a container, a filtering-material feed-conduit connected with said container, screw and valve mechanism cooperating with said feed-conduit to form a liquid-impervious plug of said solvent material and to move the same into said tank, a rotatable supporting member within said container for releasably supporting a bed of filtering material therein, a plurality of packing members rotatable independently of said supporting member and disposed above said supporting member, a conduit at one end of said bed for feeding a liquid to be filtered through said supported bed of material, an outlet conduit for said liquid at the opposite end of said bed, a filtering-material outlet-conduit, and screw and valve mechanism cooperating with said filtering-material outlet-conduit to form a liquid-impervious plug therein and to move said plug through said conduit to discharge material from the tank.

4. A filter for filtering liquids, embodying, in combination, a completely closed container, a filtering-material feed-conduit having an inlet end extending within said container at one end, mechanism for packing filtering-material adjacent to the inlet end of said feed conduit, a spiral member within said container for supporting a bed of filtering-material therein, an axial shaft extending outside said container and connected with said spiral member for rotating the same to release material from said bed, a packing spiral member spaced above said supporting spiral member, separate means for rotating each of said spiral members, a conduit at one end of said bed for feeding a liquid to be filtered through said supported bed of material, and a discharge section for discharging said released filtering-material from said tank.

MICHELE BONOTTO.